(12) United States Patent
Chang (10) Patent No.: US 9,330,609 B2
(45) Date of Patent: May 3, 2016

(54) LUMINANCE ADJUSTING METHOD FOR DISPLAY SCREEN OF ELECTRONIC DEVICE

(71) Applicant: Primax Electronics Ltd., Neihu, Taipei (TW)

(72) Inventor: Pei-Ming Chang, Taipei (TW)

(73) Assignee: PRIMAX ELECTRONICS LTD., Neihu (TW)

( * ) Notice: Subject to any disclaimer, the term of this patent is extended or adjusted under 35 U.S.C. 154(b) by 8 days.

(21) Appl. No.: 14/549,026

(22) Filed: Nov. 20, 2014

(65) Prior Publication Data

US 2016/0078823 A1 Mar. 17, 2016

(30) Foreign Application Priority Data

Sep. 12, 2014 (TW) .............................. 103131549 A (51) Int. Cl.
  *G09G 3/34* (2006.01)
  *G06F 3/0488* (2013.01)
  *G06F 3/0484* (2013.01)

(52) U.S. Cl.
  CPC .......... *G09G 3/3413* (2013.01); *G06F 3/04842* (2013.01); *G06F 3/04847* (2013.01); *G06F 3/04886* (2013.01); *G09G 2320/0626* (2013.01); *G09G 2320/0666* (2013.01); *G09G 2354/00* (2013.01)

(58) Field of Classification Search
  CPC ......... G09G 5/02; G09G 5/06; G09G 3/3413; G09G 3/3406; G09G 3/34; G09G 2320/0666; G09G 2320/0653
  See application file for complete search history.

(56) References Cited

U.S. PATENT DOCUMENTS

| 6,163,321 A * | 12/2000 | Kiyokawa | H04N 1/62 345/589 |
| 8,237,749 B2 * | 8/2012 | Kim | G09G 3/3607 345/600 |
| 2009/0213145 A1 * | 8/2009 | Onizawa | G09G 3/3413 345/690 |

* cited by examiner

*Primary Examiner* — Kevin M Nguyen
(74) *Attorney, Agent, or Firm* — Kirton McConkie; Evan R. Witt (57) ABSTRACT

A luminance adjusting method for a display screen of an electronic device includes the following steps. Firstly, a current brightness value and a current imaging color value of the display screen are recorded. In response to the user's operation, the light output of the display screen is adjusted. Consequently, the adjusted brightness value is equal to a default brightness value and the adjusted imaging color value is equal to a default imaging color value. Meanwhile, the display screen is operated in the healthy display mode. In response to the user's additional operation, the light output of the display screen is adjusted. Consequently, the adjusted brightness value is equal to the recorded current brightness value and the adjusted imaging color value is equal to the recorded current imaging color value. Meanwhile, the display screen is restored to the normal display mode.

10 Claims, 5 Drawing Sheets

LUMINANCE ADJUSTING METHOD FOR DISPLAY SCREEN OF ELECTRONIC DEVICE

FIELD OF THE INVENTION

The present invention relates to a luminance adjusting method for a display screen of an electronic device, and more particularly to a luminance adjusting method for a display screen of an electronic device by changing a brightness value and an imaging color value of the display screen.

BACKGROUND OF THE INVENTION

With increasing development of science and technology, electronic devices become more and more popular to users. The widely-used electronic devices include for example desktop computers, notebook computers, smart phones, tablet computers, or the like. Each of these electronic devices has a display screen for displaying an image of the electronic device. Consequently, the electronic device can be operated by the user through the display screen.

For example, the portable electronic device (e.g. the notebook computer, the smart phone and the tablet computer) is a small size and easily carried. Consequently, before the user sleeps, the user usually lies in bed and operates the portable electronic device. Generally, the brightness value of the light source near the bed is very low. Otherwise, the portable electronic device is used in a dark environment without turning on the light source because the display screen of the electronic device can emit light beams.

The display screen of the electronic device is illuminated by the light beams that are emitted from an illumination module within the electronic device. Consequently, the image is displayed on the display screen and the light beams are outputted from the display screen. In case that the ambient light source is dim or the environment is dark, the light beams outputted from the display screen are detrimental to user's eyes and thus the user is readily suffered from vision impairment. Moreover, the long-term injury of the user's eyes may easily lead to macular degeneration of the user's eyes. Consequently, when the electronic device is operated in the dim or dark environment, the user only has to reduce the brightness value of the display screen of the electronic device or turn off the light source in order to reduce the injury of the user's eyes by the light beams of the display screen.

However, the user is only able to roughly reduce the brightness value of the display screen. When the day dawns or the ambient light source is sufficient, the user has to increase the brightness value of the display screen again. Since the processes of repeatedly reducing and increasing the brightness value of the display screen are inconvenient, the user is usually unwilling to reduce the brightness value of the display screen in the dim or dark environment because of laziness. Moreover, before the brightness value of the display screen is reduced, the user has to memorize the current brightness value of the display screen. Consequently, if necessary, the brightness value of the display screen can be restored to the original brightness value. Since the way of memorizing the current brightness value of the display screen is troublesome, the user is usually unwilling to memorize the current brightness value of the display screen.

Therefore, there is a need of providing an easy-to-use luminance adjusting method for a display screen of an electronic device in order to overcome the above drawbacks.

SUMMARY OF THE INVENTION

An object of the present invention provides an easy-to-use luminance adjusting method for a display screen of an electronic device.

In accordance with an aspect of the present invention, there is provided a luminance adjusting method for a display screen of an electronic device. The luminance adjusting method includes the following steps. Firstly, a default brightness value and a default imaging color value are stored. Then, a current brightness value and a current imaging color value of the display screen are recorded in response to an activating operation. Then, a light output of an illumination module of the display screen is adjusted in response to a triggering operation. Consequently, an adjusted brightness value of the display screen is equal to the default brightness value and an adjusted imaging color value of the display screen is equal to the default imaging color value. Then, the light output of the illumination module of the display screen is adjusted in response to an additional triggering operation. Consequently, the adjusted brightness value of the display screen is equal to the recorded current brightness value and the adjusted imaging color value of the display screen is equal to the recorded current imaging color value, wherein the default brightness value is lower than the current brightness value, and the default imaging color value is lower than the current imaging color value.

From the above descriptions, the present invention provides the luminance adjusting method for the display screen of the electronic device. Firstly, the current brightness value and the current imaging color value of the display screen of the electronic device are recorded. Then, if necessary, the virtual triggering key or the luminance adjusting program is triggered in order to change the light output of the illumination module of the display screen. Consequently, the adjusted brightness value of the display screen is equal to the default brightness value and the adjusted imaging color value of the display screen is equal to the default imaging color value. That is, the display screen is operated in the healthy display mode, so that the user's eyes can be protected. If the user wants to operate the display screen in the normal display mode, the virtual triggering key or the luminance adjusting program may be triggered again in order to change the light output of the illumination module of the display screen again. Consequently, the adjusted brightness value of the display screen is equal to the recorded current brightness value and the adjusted imaging color value of the display screen is equal to the recorded current imaging color value. Under this circumstance, the display screen is switched to the normal display mode. In according to the luminance adjusting method of the present invention, the luminance adjusting program may perform corresponding actions corresponding to different operations of the user. Moreover, the current brightness value and the current imaging color value of the display screen are recorded by the luminance adjusting program. Consequently, the display screen can be restored to the original display mode by the luminance adjusting program. Since it is not necessary for the user to memorize the current brightness value of the display screen, the luminance adjusting method of the present invention is more user-friendly.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks of the prior art technologies, the present invention provides a luminance adjusting method for a display screen of an electronic device.

The operating principles of the present invention will be illustrated as follows. It was found that the brightness value of a display screen of an electronic device is positively correlated with the fatigue degree of the user's eyes when the electronic device is operated in a dim environment. That is, as the brightness value of the brightness value of a display screen increases, the possibility of causing injury of the user's eyes increases. Moreover, the blue light outputted from the display screen may easily lead to macular degeneration of the user's eyes. In accordance with the feature of the present invention, for reducing the intensity of the light beams outputted from the display screen, the brightness value of the light beams and the intensity of the blue light are reduced. Consequently, the user's eyes can be protected.

Figure 1:
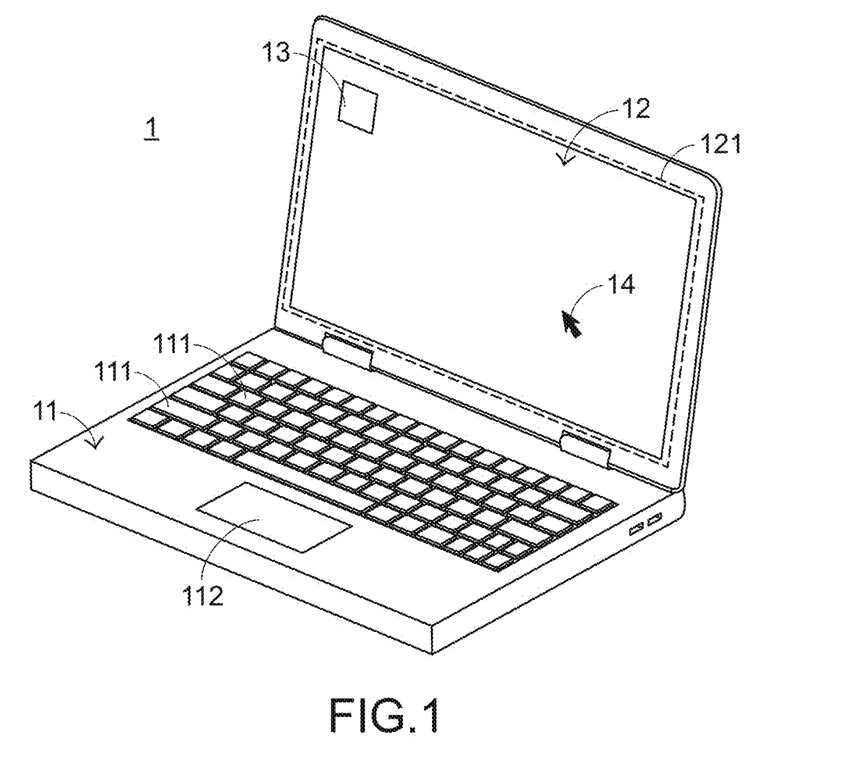
FIG. 1 schematically illustrating an electronic device for implementing a luminance adjusting method according to an embodiment of the present invention.

Hereinafter, the structure of an electronic device will be illustrated with reference to FIG. 1. FIG. 1 schematically illustrating an electronic device for implementing a luminance adjusting method according to an embodiment of the present invention. As shown in FIG. 1, the electronic device 1 comprises a base 11, a display screen 12 and a luminance adjusting program 13. The base 11 comprises plural keys 111 and a touchpad 112. When one of the plural keys 111 is depressed by the user, a corresponding key signal is generated. The touchpad 112 is arranged beside the plural keys 111. When the touchpad 112 is touched and moved by the user's finger, a cursor 14 of the electronic 1 is correspondingly moved. The display screen 12 is used for displaying an image. In addition, the display screen 12 comprises an illumination module 121. The illumination module 121 is disposed within the display screen 12. Moreover, the illumination module 121 is used for emitting light beams. Consequently, the display screen 12 is illuminated, and the image is viewed by the user. In this embodiment, the illumination module 121 is a light emitting diode array. The brightness/darkness of the image displayed on the display screen 12 may be expressed by a brightness value, and the chroma of the image may be expressed by an imaging color value. The imaging color includes a red color, a green color and a blue color. Consequently, the color of the displayed image is a mixed color of the red color, the green color and the blue color.

As shown in FIG. 1, the luminance adjusting program 13 is displayed on the display screen 12 as a corresponding icon. When the user's finger is moved on the touchpad 112 and the cursor 14 is correspondingly moved to the luminance adjusting program 13, the luminance adjusting program 13 is activated. Consequently, the luminance adjusting method for a display screen of an electronic device according to the present invention will be activated. In this embodiment, the electronic device 1 is a notebook computer, and the operating system installed in the electronic device 1 is a Microsoft Windows operating system. It is noted that the type of the electronic device 1 is not restricted. For example, in another embodiment, the electronic device is a smart phone or a tablet computer.

Figure 2:
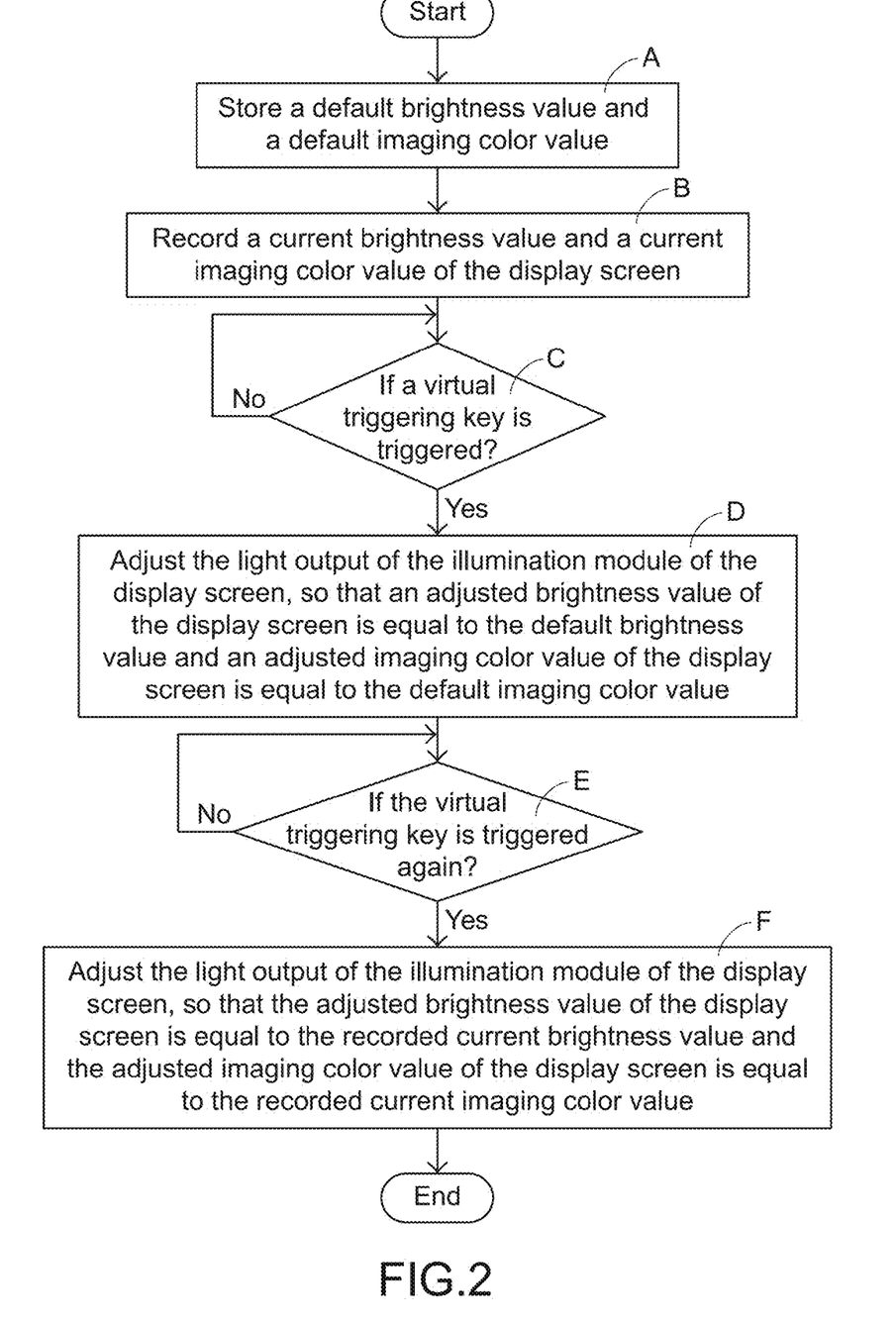
FIG. 2 is a flowchart illustrating a luminance adjusting method for a display screen of an electronic device according to an embodiment of the present invention.

A luminance adjusting method of the present invention will be illustrated as follows. FIG. 2 is a flowchart illustrating a luminance adjusting method for a display screen of an electronic device according to an embodiment of the present invention. The luminance adjusting method comprises the following steps A-F. In the step A, a default brightness value and a default imaging color value are stored. In the step B, a current brightness value and a current imaging color value of the display screen are recorded in response to an activating operation. The step C is performed to judge whether a virtual triggering key is triggered. In the step D, the light output of the illumination module of the display screen is adjusted in response to a triggering operation. Consequently, an adjusted brightness value of the display screen is equal to the default brightness value and an adjusted imaging color value of the display screen is equal to the default imaging color value. The step E is performed to judge whether the virtual triggering key is triggered again. In the step F, the light output of the illumination module of the display screen is adjusted in response to an additional triggering operation. Consequently, the adjusted brightness value of the display screen is equal to the recorded current brightness value and the adjusted imaging color value of the display screen is equal to the recorded current imaging color value.

Moreover, the step B comprises the following sub-steps B1 and B2. In the sub-step B1, in response to the activating operation, the current brightness value and the current imaging color value of the display screen corresponding to the time point of starting the activating operation are recorded. In the sub-step B2, the virtual triggering key is displayed on the display screen of the electronic device.

Figure 3:
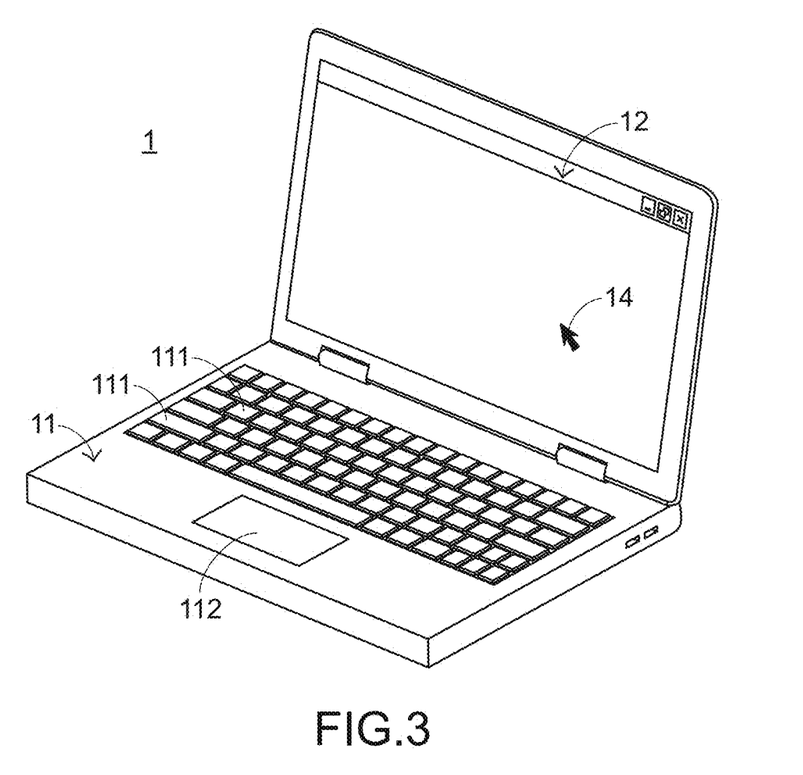
FIG. 3 schematically illustrates an image displayed on the display screen of the electronic device for implementing the luminance adjusting method according to the embodiment of the present invention.

Hereinafter, the detailed procedures of the luminance adjusting method of the present invention will be illustrated with reference to FIGS. 1, 2 and 3. FIG. 3 schematically illustrates an image displayed on the display screen of the electronic device for implementing the luminance adjusting method according to the embodiment of the present invention. The image is displayed on the display screen 12 of the electronic device 1.

Firstly, in the step A, the default brightness value and the default imaging color value are stored. The default imaging color value is a blue light intensity of three imaging colors. In this embodiment, the default brightness value and the default imaging color value are previously stored in the luminance adjusting program 13. Moreover, the default brightness value may be a brightness value that is obtained by experiments. If the brightness value of the display screen 12 is equal to the default brightness value, the lighting injury to the user's eyes will be minimized. Similarly, the default imaging color value may be an imaging color value that is obtained by experiments. If the imaging color value of the display screen 12 is equal to the default imaging color value, the lighting injury to the user's eyes will be minimized.

If the user is ready to sleep and the user wants to operate the electronic device 1 before sleep, the user may touch the touchpad 112 to trigger the luminance adjusting program 13. After an activating operation inputted by the user is received by the luminance adjusting program 13, the luminance adjusting program 13 is activated. Consequently, at the time point of receiving the activating operation, the luminance adjusting program 13 performs the sub-step B1 according to a brightness inquiry command and an image color inquiry command. In the sub-step B1, when the activating operation is performed, the current brightness value and the current imaging color value of the display screen 12 corresponding to the time point of starting the activating operation are recorded by the luminance adjusting program 13. The brightness value at this time point of the display screen 12 is defined as the current brightness value, and the imaging color value of the display screen 12 at this time point of the display screen 12 is defined as the current imaging color value. Then, in the sub-step B2, the virtual triggering key 15 is displayed on the display screen 12 of the electronic device. The appearance of the virtual triggering key 15 is shown in FIG. 4.

In an embodiment, the brightness inquiry command is a GetDeviceGammaRamp command of a Windows API of the Windows operating system. According to the brightness inquiry command, the current brightness value of the display screen 12 is inquired. In addition, the image color inquiry command is a WmiMonitorBrightness Class command of the Windows API of the Windows operating system. According to the image color inquiry command, the current imaging color value of the display screen 12 is inquired.

Figure 4:
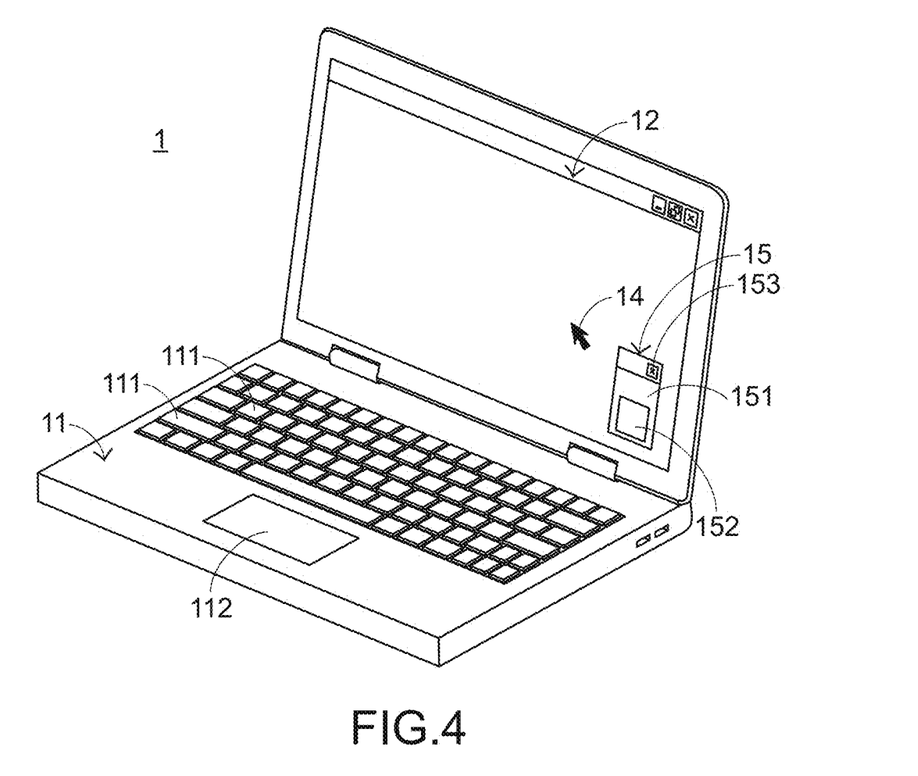
FIG. 4 schematically illustrates a virtual triggering key displayed on the display screen of the electronic device for implementing the luminance adjusting method according to the embodiment of the present invention.

Please refer to FIG. 4. The virtual triggering key 15 comprises a moving zone 151, a triggering zone 152 and a closing zone 153. When the triggering zone 152 is clicked by the user, the clicking action is considered as the triggering operation, so that the luminance adjusting program 13 performs the step D. When the closing zone 153 is clicked by the user, the virtual triggering key 15 is closed by the luminance adjusting program 13. The moving zone 151 is arranged around the triggering zone 152. When the moving zone 151 is continuously clicked and the moving zone 151 is moved, the position of the virtual triggering key 15 is moved in response to the dragging action.

Figure 5:
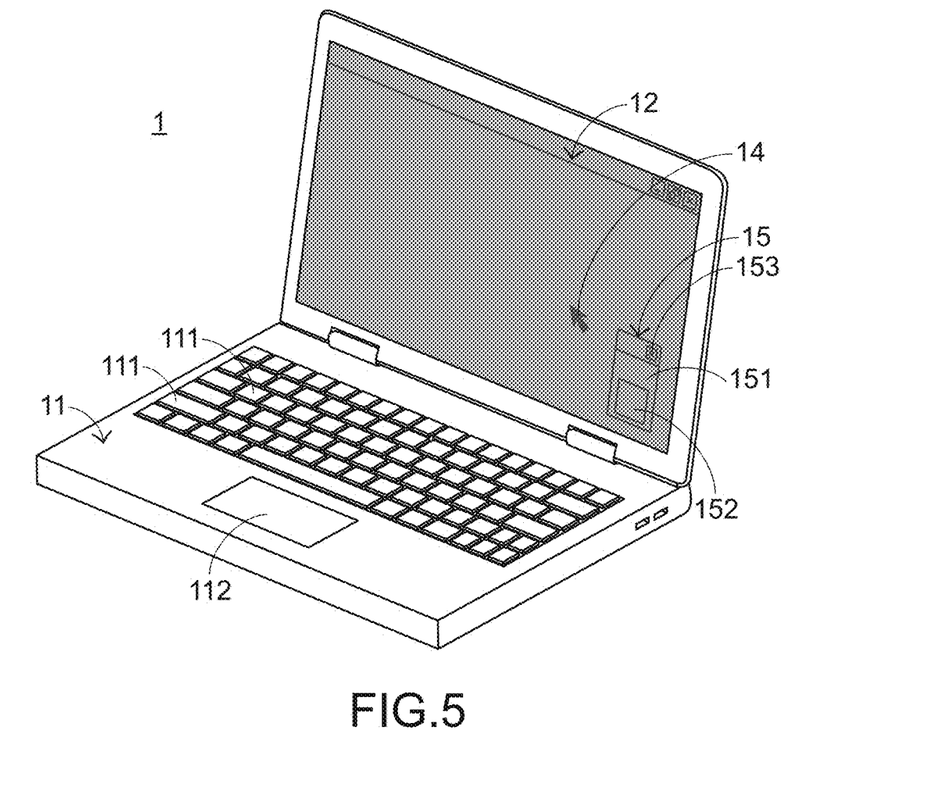
FIG. 5 schematically illustrates the display screen of the electronic device for implementing the luminance adjusting method according to the embodiment of the present invention, in which the display screen has the default brightness value and the default imaging color value.

After the virtual triggering key 15 is displayed on the touch screen 12, the luminance adjusting program 13 performs the step C to judge whether the virtual triggering key 15 is triggered. If the triggering zone 152 of the virtual triggering key 15 is not triggered, the step C is repeatedly done by the luminance adjusting program 13. If the user touches the touchpad 112 to click the triggering zone 152, the luminance adjusting program 13 judges that the virtual triggering key 15 is triggered and the luminance adjusting program 13 performs the step D according to a brightness setting command and an image color setting command. In the step D, the light output of the illumination module 121 of the display screen 12 is adjusted by the luminance adjusting program 13 in response to a triggering operation. Consequently, the adjusted brightness value of the display screen 12 is changed from the current brightness value to the default brightness value, and the adjusted imaging color value of the display screen 12 is changed from the current imaging color value to the default imaging color value. The image on the display screen 12 is shown in FIG. 5. The default brightness value is lower than the current brightness value, and the default imaging color value is lower than the current imaging color value. Consequently, the light beams outputted from the illumination module 121 have low brightness value and low blue component. Under this circumstance, the image displayed on the display screen 12 is darker than the original image of FIG. 3, and the yellowish luminance efficacy is generated. That is, due to the light beams generated by the illumination module 121 in the step D, the luminance of the display screen 12 becomes gentler. Consequently, the lighting injury to the user's eyes is reduced. That is, in the step D, the operating mode of the display screen 12 is switched from the original normal display mode to a healthy display mode. When the display screen 12 is operated in the healthy display mode, the user's eyes can be protected.

In an embodiment, the brightness setting command is an IOCTL_VIDEO_SET_DISPLAY_BRIGHTNESS command of the Windows API of the Windows operating system. According to the brightness setting command, the light beams outputted from the illumination module 121 of the display screen 12 are set. Consequently, the adjusted brightness value of the display screen 12 is equal to the current brightness value or the default brightness value. Under this circumstance, different brightness values of the display screen 12 can be generated. Moreover, the image color setting command is a SetDeviceGammaRamp command of the Windows API of the Windows operating system. According to the image color setting command, the light beams outputted from the illumination module 121 of the display screen 12 are set. Consequently, the adjusted imaging color value of the display screen 12 is equal to the current imaging color value or the default imaging color value. Under this circumstance, different chroma of the display screen 12 can be generated.

Then, the luminance adjusting program 13 performs the step E to judge whether the virtual triggering key 15 is triggered again. If the triggering zone 152 of the virtual triggering key 15 is not triggered again, the step E is repeatedly done by the luminance adjusting program 13. After the electronic device 1 is operated in the healthy display mode for a certain time period, the user may feel tired and then sleep. Generally, when the day dawns and the ambient light source is sufficient, the electronic device 1 may be used again. Since the electronic device 1 is operated in the healthy display mode, the user may feel that the display screen 12 is too dark. Meanwhile, if the user may touch the touchpad 112 to click the triggering zone 152 of the virtual triggering key 15, the luminance adjusting program 13 judges that the virtual triggering key 15 is triggered again and the luminance adjusting program 13 performs the step F according to the brightness setting command and the image color setting command. In the step F, the light output of the illumination module 121 of the display screen 12 is adjusted in response to an additional triggering operation. Consequently, the adjusted brightness value of the display screen 12 is changed from the default brightness value to the current brightness value of the normal display mode, and the adjusted imaging color value of the display screen 12 is changed from the default imaging color value to the current imaging color value. Meanwhile, the adjusted brightness value and the adjusted imaging color value are helpful for the user to operate the electronic device 1. Then, the user may close the virtual triggering key 15 in order to close the luminance adjusting program 13. When the display screen 12 of the electronic device 1 needs to be operated in the healthy display mode, the luminance adjusting program 13 is activated again. Meanwhile, the luminance adjusting method for the display screen of the electronic device is completed.

The following four aspects should be specially described. Firstly, in the step A of this embodiment, the default brightness value and the default imaging color value are stored during the startup process of the luminance adjusting program 13. Alternatively, in another embodiment, the default brightness value and the default imaging color value are set according to the practical requirements, and the setting step is performed after the luminance adjusting program is activated.

Secondly, the commands used in the luminance adjusting method of this embodiment include the GetDeviceGammaRamp command, the SetDeviceGammaRamp command, the WmiMonitorBrightness Class command and the IOCTL_VIDEO_SET_DISPLAY_BRIGHTNESS command, but are not limited thereto. In case that the operating system installed in the electronic device is different (e.g. the Macintosh operating system), the corresponding commands used in the luminance adjusting method of the present invention are determined according to the operating system.

Thirdly, in this embodiment, the sub-step B1 is prior to the sub-step B2. Alternatively, in another embodiment, the sub-step B1 and the sub-step B2 are simultaneously performed. For example, while the luminance adjusting program is activated and the current brightness value and the current imaging color value of the display screen corresponding to the time point of starting the activating operation by the illumination module of the display screen are recorded, the virtual triggering key is also displayed on the display screen of the electronic device. For simultaneously performing the sub-step B1 and the sub-step B2, the electronic device should be equipped with a microprocessor having a powerful computing capability. Alternatively, the following procedures may be performed. That is, the virtual triggering key is firstly displayed on the display screen of the electronic device when the luminance adjusting program judges that the activating operation is started, and then the current brightness value and the current imaging color value of the display screen corresponding to the time point of starting the activating operation by the illumination module of the display screen are recorded.

Fourthly, in this embodiment, the step D and the step F are performed after the virtual triggering key is clicked. Alternatively, in another embodiment, the luminance adjusting method of the present invention may be performed with the need of displaying the virtual triggering key. For example, when the user clicks the luminance adjusting program to execute the luminance adjusting program at a first time, the clicking action of the user is considered as the activating operation by the luminance adjusting program and thus the luminance adjusting program is activated. If the user wants to operate the display screen in the healthy display mode, the user may click the luminance adjusting program at a second time. Meanwhile, the clicking action of the user is considered as the triggering operation by the luminance adjusting program. In response to the triggering operation, the light output of the illumination module of the display screen is adjusted, so that the display screen is switched to the healthy display mode. If the user wants to operate the display screen in the normal display mode, the user may click the luminance adjusting program at a third time. Meanwhile, the clicking action of the user is considered as the additional triggering operation by the luminance adjusting program. In response to the additional triggering operation, the light output of the illumination module of the display screen is adjusted, so that the display screen is switched to the normal display mode.

Moreover, if the electronic device has a touch control function (i.e. the display screen is a touch screen), the user may directly trigger the luminance adjusting program or the virtual triggering key with a finger or a stylus. Under this circumstance, the luminance adjusting method of the present invention may be implemented without the need of using the touchpad.

From the above descriptions, the present invention provides the luminance adjusting method for the display screen of the electronic device. Firstly, the current brightness value and the current imaging color value of the display screen of the electronic device are recorded. Then, if necessary, the virtual triggering key or the luminance adjusting program is triggered in order to change the light output of the illumination module of the display screen. Consequently, the adjusted brightness value of the display screen is equal to the default brightness value and the adjusted imaging color value of the display screen is equal to the default imaging color value. That is, the display screen is operated in the healthy display mode, so that the user's eyes can be protected. If the user wants to operate the display screen in the normal display mode, the virtual triggering key or the luminance adjusting program may be triggered again in order to change the light output of the illumination module of the display screen again. Consequently, the adjusted brightness value of the display screen is equal to the recorded current brightness value and the adjusted imaging color value of the display screen is equal to the recorded current imaging color value. Under this circumstance, the display screen is switched to the normal display mode. In according to the luminance adjusting method of the present invention, the luminance adjusting program may perform corresponding actions corresponding to different operations of the user. Moreover, the current brightness value and the current imaging color value of the display screen are recorded by the luminance adjusting program. Consequently, the display screen can be restored to the original display mode by the luminance adjusting program. Since it is not necessary for the user to memorize the current brightness value of the display screen, the luminance adjusting method of the present invention is more user-friendly.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A luminance adjusting method for a display screen of an electronic device, the luminance adjusting method comprising steps of:
    storing a default brightness value and a default imaging color value;
    recording a current brightness value and a current imaging color value of the display screen in response to an activating operation;
    adjusting a light output of an illumination module of the display screen in response to a triggering operation, so that an adjusted brightness value of the display screen is equal to the default brightness value and an adjusted imaging color value of the display screen is equal to the default imaging color value; and
    adjusting the light output of the illumination module of the display screen in response to an additional triggering operation, so that the adjusted brightness value of the display screen is equal to the recorded current brightness value and the adjusted imaging color value of the display screen is equal to the recorded current imaging color value, wherein the default brightness value is lower than the current brightness value, and the default imaging color value is lower than the current imaging color value.

2. The luminance adjusting method according to claim 1, wherein the current brightness value of the display screen is recorded according to a brightness inquiry command, and the current imaging color value of the display screen is recorded according to an image color inquiry command.

3. The luminance adjusting method according to claim 1, wherein the light output of the illumination module of the display screen is adjusted according to a brightness setting command and an image color setting command.

4. The luminance adjusting method according to claim 1, wherein the step of recording the current brightness value and the current imaging color value of the display screen in response to the activating operation comprises sub-steps of:
    recording the current brightness value and the current imaging color value of the display screen corresponding to a time point of starting the activating operation; and
    displaying a virtual triggering key on the display screen of the electronic device.

5. The luminance adjusting method according to claim 4, wherein after the virtual triggering key is displayed on the display screen of the electronic device, the luminance adjusting method further comprises a step of detecting whether the virtual triggering key is triggered, wherein if the virtual triggering key is triggered, the light output of the illumination module of the display screen is adjusted, so that the adjusted brightness value of the display screen is equal to the default brightness value and the adjusted imaging color value of the display screen is equal to the default imaging color value.

6. The luminance adjusting method according to claim 5, wherein after the light output of the illumination module of the display screen is adjusted such that the adjusted brightness value of the display screen is equal to the default brightness value and the adjusted imaging color value of the display screen is equal to the default imaging color value, the luminance adjusting method further comprises a step of detecting whether the virtual triggering key is triggered again, whether if the virtual triggering key is triggered again, the light output of the illumination module of the display screen is adjusted, so that the adjusted brightness value of the display screen is equal to the recorded current brightness value and the adjusted imaging color value of the display screen is equal to the recorded current imaging color value.

7. The luminance adjusting method according to claim 1, wherein the step of recording the current brightness value and the current imaging color value of the display screen in response to the activating operation comprises sub-steps of:
    displaying a virtual triggering key on the display screen of the electronic device in response to the activating operation; and
    recording the current brightness value and the current imaging color value of the display screen corresponding to a time point of starting the activating operation.

8. The luminance adjusting method according to claim 7, wherein after the current brightness value and the current imaging color value of the display screen corresponding to a time point of starting the activating operation are recorded, the luminance adjusting method further comprises a step of detecting whether the virtual triggering key is triggered, wherein if the virtual triggering key is triggered, the light output of the illumination module of the display screen is adjusted, so that the adjusted brightness value of the display screen is equal to the default brightness value and the adjusted imaging color value of the display screen is equal to the default imaging color value.

9. The luminance adjusting method according to claim 8, wherein after the light output of the illumination module of the display screen is adjusted such that the adjusted brightness value of the display screen is equal to the default brightness value and the adjusted imaging color value of the display screen is equal to the default imaging color value, the luminance adjusting method further comprises a step of detecting whether the virtual triggering key is triggered again, whether if the virtual triggering key is triggered again, the light output of the illumination module of the display screen is adjusted, so that the adjusted brightness value of the display screen is equal to the recorded current brightness value and the adjusted imaging color value of the display screen is equal to the recorded current imaging color value.

10. The luminance adjusting method according to claim 1, wherein the recorded current imaging color value is a blue light intensity of an imaging color of the display screen.

* * * * *